(12) United States Patent
Gindi

(10) Patent No.: US 8,602,039 B1
(45) Date of Patent: *Dec. 10, 2013

(54) PERSONAL ELECTRONICS DEVICE PROTECTIVE CASE WITH COSMETICS COMPARTMENT

(76) Inventor: Isaac Gindi, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/878,614

(22) Filed: Sep. 9, 2010

Related U.S. Application Data

(63) Continuation-in-part of application No. 12/005,419, filed on Dec. 26, 2007, now Pat. No. 8,276,599.

(60) Provisional application No. 60/876,653, filed on Dec. 22, 2006.

(51) Int. Cl.
- *A45D 27/22* (2006.01)
- *A45D 33/26* (2006.01)
- *B65D 71/00* (2006.01)

(52) U.S. Cl.
USPC ............ 132/315; 132/294; 206/823; 206/581

(58) Field of Classification Search
USPC ......... 132/293–297, 300, 313, 314, 315, 287; 206/581, 823
See application file for complete search history.

(56) References Cited

U.S. PATENT DOCUMENTS

| | | | |
|---|---|---|---|
| 1,534,497 A * | 4/1925 | Boorman | 132/297 |
| 1,895,061 A * | 1/1933 | Worssam | 132/287 |
| 6,311,077 B1 * | 10/2001 | Bien | 455/566 |
| 6,363,947 B1 * | 4/2002 | Wu | 132/297 |
| 7,054,668 B2 * | 5/2006 | Endo et al. | 455/566 |
| 7,146,184 B1 * | 12/2006 | Tsitsiashvili | 455/550.1 |
| 2002/0137537 A1 * | 9/2002 | Watanabe | 455/550 |
| 2003/0173369 A1 * | 9/2003 | Nikolaus et al. | 220/830 |

* cited by examiner

*Primary Examiner* — Robyn Doan
(74) *Attorney, Agent, or Firm* — Steven C. Wichmann

(57) ABSTRACT

A protective case for a personal electronics device of the type such as, but not limited to, cell phones, personal digital assistants, digital camera, and digital electronic games, includes a shell defining a first compartment and a second compartment. The first compartment formed to closely receive and retain a personal electronics device therein, and the second compartment defining a selectively accessible storage volume. A cosmetic tray is housed in the accessible storage volume and has at least one form of cosmetic selected from the group of nail polish, mascara, eyeliner, lipstick, lip liner, and lip gloss.

16 Claims, 12 Drawing Sheets

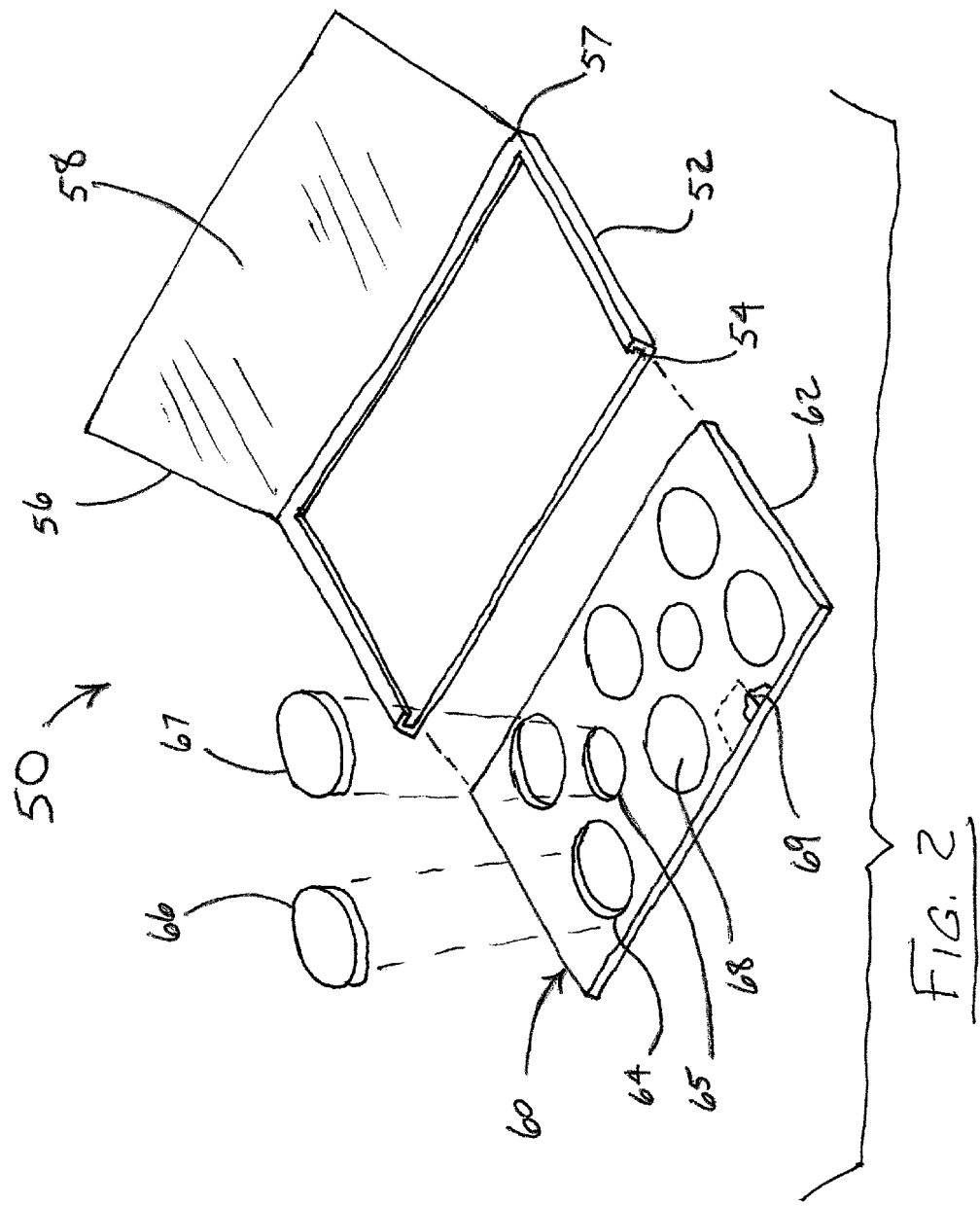

PERSONAL ELECTRONICS DEVICE PROTECTIVE CASE WITH COSMETICS COMPARTMENT

CROSS REFERENCE TO RELATED APPLICATIONS

This application is a continuation-in-part of U.S. Non-Provisional application Ser. No. 12/005,419, filed 26 Dec. 2007, now U.S. Pat. No. 8,276,599, issued on Oct. 2, 2012 which is included in its entirety herein and which claims the benefit of U.S. Provisional Patent Application Ser. No. 60/876,653 filed 22 Dec. 2006.

BACKGROUND OF THE INVENTION

1. Field of the Invention

The present invention relates to protective cases for personal electronics devices in general and more particularly to a protective case for a personal electronics device that includes a compartment for cosmetics.

2. Discussion of the Related Art

From centuries past, women have been wearing cosmetics to enhance their physical appearance. Cosmetics containers are well known in the art. A large variety of such containers are currently commercialized and sold. They include small cases, such as tubes or circular cases for containing lipstick, mascara, eyeliner, lip liner, nail polish, and other health and beauty aids. Such containers with the cosmetics included therein, are widely used by people from adolescence to old age.

Women have typically carried their cosmetics with them in abbreviated form by using containers also known as "compacts" that they keep in a handbag in which they also keep other personal items such as a wallet, keys, tissues, pens, notepads, etc. for convenience. In order to conserve space in a woman's handbag, compacts are typically made to be relatively thin with a mirror integrated within the compact. The compact will typically have one or more small compartments for each composition of makeup contained therein. In this manner a woman can touch up her makeup throughout the day without the need for an entire collection of separate bottles and containers.

In recent years the wearing of cosmetics has also become ever more popular with teenage girls. However, today's teenage girls generally shun the use of handbags and are most often seen wearing casual clothes and carrying only those items they consider to be essential to their daily life. Typically, these essentials are limited to a form of identification, money, and a cell phone or other type of personal electronics device such as a personal digital assistant or a digital electronic game. Since they shun the carrying of handbags, these adolescent girls are limited in the number and bulk of items that they can carry on their person. Additionally, adolescent girls are always looking for new and unique items to enhance their appearance and stature among their peers.

Thus what is desired is a personal electronics device or a protective case for such devices as a cell phone, personal digital assistant, or digital electronic game that incorporates within the protective case a compartment for containing replaceable cosmetic trays.

SUMMARY OF THE INVENTION

The present invention is directed to personal electronics devices that include a compartment for cosmetics that satisfies the need for a convenient way to carry cosmetics with the personal electronics device. The personal electronics device is of the type such as, but not limited to, cell phones, personal digital assistants, digital camera, and digital electronic games and includes a case having a first compartment and a second compartment. A series of integrated electronic components perform a desired personal electronics function wherein at least a portion of the components are housed in the first compartment. The second compartment defines a selectively accessible storage volume. A cosmetic tray is housed in the accessible storage volume and has at least one form of cosmetic selected from the group of nail polish, mascara, eyeliner, lipstick, lip liner, and lip gloss.

Another aspect of the present invention is a personal electronics device of the type such as, but not limited to, cell phones, personal digital assistants, digital camera, and digital electronic games, wherein the personal electronics device includes a case having a first compartment and a second compartment. The first compartment houses at least a portion of a series of integrated electronic components to perform a desired personal electronic function. The second compartment defines a selectively accessible storage volume and contains therein a replaceable cosmetic tray. The cosmetic tray includes thereon at least one form of cosmetic selected from the group of nail polish, mascara, eyeliner, lipstick, lip liner, and lip gloss, and also includes a readable electronic identification module for recognition by the series of integrated electronic components.

Yet another aspect of the present invention is a replaceable cosmetics tray for use in a personal electronics device of the type having a first compartment for housing a series of integrated electronic components for performing a desired personal electronic function and a second compartment for housing the replaceable cosmetics tray. The replaceable cosmetics tray includes a substrate configured to be received in the second compartment and defines at least one recess for holding a cosmetic therein. At least one form of cosmetic is deposited in the recess, the cosmetic being selected from the group of nail polish, mascara, eyeliner, lipstick, lip liner, and lip gloss. A readable electronic identification module is associated with the tray for recognition by the series of integrated electronic components.

Still another aspect of the present invention is a protective case for a personal electronics device of the type such as, but not limited to, cell phones, personal digital assistants, digital camera, and digital electronic games, includes a shell defining a first compartment and a second compartment. The first compartment is formed to closely receive and retain a personal electronics device therein, and the second compartment defines a selectively accessible storage volume. A cosmetic tray is housed in the accessible storage volume and has at least one form of cosmetic selected from the group of nail polish, mascara, eyeliner, lipstick, lip liner, and lip gloss.

A further aspect of the present invention is a protective case for a personal electronics device of the type such as, but not limited to, cell phones, personal digital assistants, digital camera, and digital electronic games. The protective case has a shell defining a first compartment and a second compartment. The first compartment is formed to closely receive and retain a personal electronics device therein, and the second compartment defines a selectively accessible storage volume. A replaceable cosmetic tray is housed in the accessible storage volume and includes a substrate defining a plurality of recesses therein for holding cosmetics and at least one form of cosmetic deposited in each of the recesses. Each cosmetic is selected from the group of nail polish, mascara, eyeliner, lipstick, lip liner, and lip gloss.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which:

FIG. 2 is an exploded perspective view of the cosmetics tray of FIG. 1;

Like reference numerals refer to like parts throughout the several views of the drawings.

DETAILED DESCRIPTION OF THE PREFERRED EMBODIMENT

Figure 1:
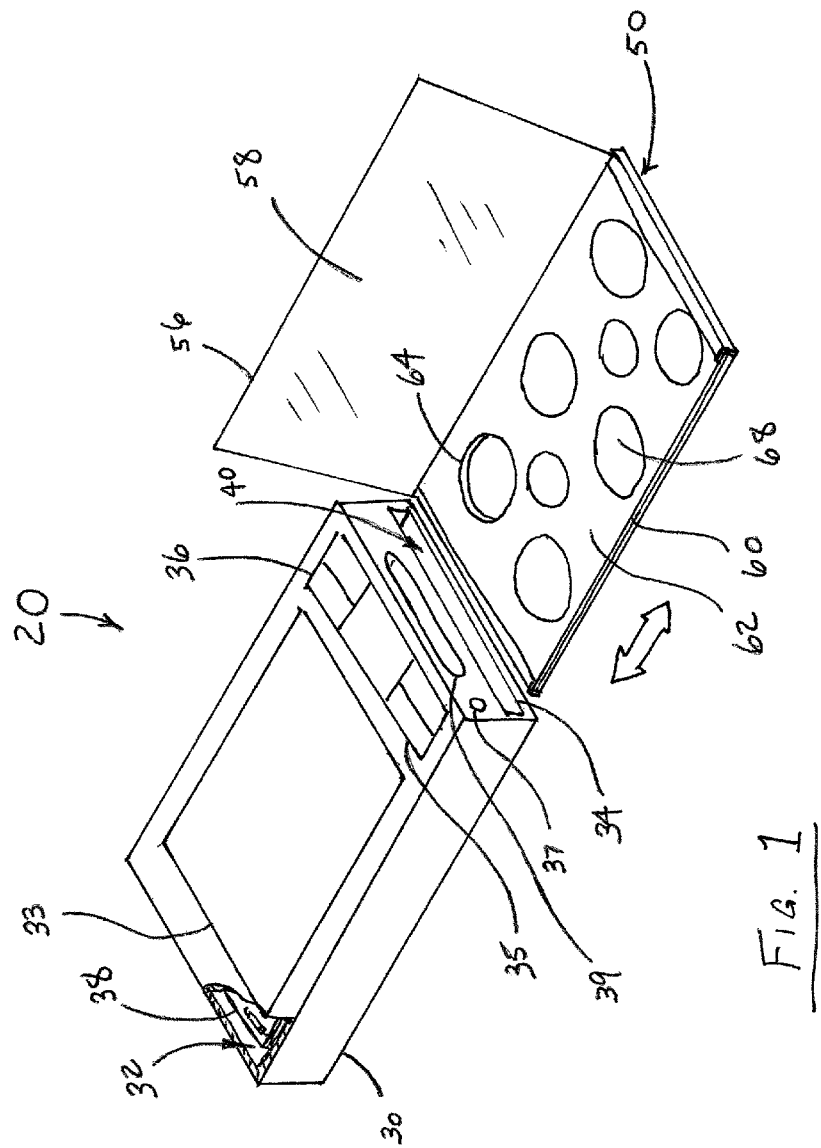
FIG. 1 is a perspective view of a personal electronics device embodying the present invention, wherein the personal electronics device includes a compartment housing a cosmetics tray.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims Hence, specific dimensions and other physical characteristics relating to the embodiments disclosed herein are not to be considered as limiting, unless the claims expressly state otherwise.

Turning to the drawings, FIG. 1 shows a personal electronics device 20 which is one of the preferred embodiments of the present invention and illustrates its various components. Personal electronics device 20 is here illustrated as a personal digital assistant, but the practices and concepts recited in the following descriptions and claims are also applicable to other personal electronic devices such as cellular telephones, digital cameras, digital electronic games, and other similar personal electronic devices.

Personal electronic device 20 has a case 30 which retains all components in a functional arrangement and for component protection. Case 30 allows for ease of trans-porting and can be decorated in an endless configuration of designs, colors, and entertaining features such as blinking lights, etc. Case 30 is generally divided into a first compartment 32 and a second compartment 34. First compartment 32 is dedicated to housing a series of integrated electronic components 38 that perform a desired personal electronic function such as transmitting and receiving a cellular telephone call, taking a digital picture, or playing a digital electronic game as examples. Case 30 can also include user interactive features such as a display screen33, user control keys 35, 36, a removable stylus 37, and can also feature a receptacle 39 for receiving small digital electronic cards (not shown) for memory storage or for providing additional functionality to personal electronic device 20.

Second compartment 34, while an integral part of case 30 is generally isolated from first compartment 32. Second compartment 34 defines a selectively accessible storage volume 40 in which the user may store any article that is compatible with the storage volume 40. In the most preferred embodiment, a cosmetic insert 50 received in storage volume 40 is provided with the personal electronics device 20. Referring now to FIG. 2, cosmetic insert 50 typically includes a tray carrier 52 having a recess 54 for receiving therein in slidable fashion cosmetic tray 60. Tray carrier 52 can also incorporate a folding cover 56 that is rotatable about hinge 57 to cover cosmetic tray 60 for storage in second compartment 34. Folding cover 56 can also have a mirror 58 attached thereto for the convenience of the user. Cosmetic tray 60 is readily removable from carrier 52 and is thus readily replaceable with a replacement cosmetic tray 50 once the cosmetics have been depleted.

Cosmetic tray 60 in its most common configuration includes a substrate 62. Substrate 62 defines a plurality of recesses 64, 65 wherein each recess 64, 65 receives therein a unique cosmetic deposit 66, 67 respectively. Cosmetic deposits 66, 67 are typically selected from at least one of the forms of nail polish, mascara, eyeliner, lipstick, lip liner, and lip gloss, and can be of a variety of colors and shades to suit the desires of the user. The cosmetic deposits such as deposits 66, 67 when received in a recess such as recesses 64, 65 are securely held in place in a manner well known in the industry to prevent the spillage of the cosmetic from the tray 60 during use and carrying of the personal electronics device. Substrate 62 is also formed in a manner well known in the cosmetics industry and its peripheral form factor is regulated to fit carrier 52.

Substrate 62 further has associated therewith a readable electronic identification module 69. Readable electronic identification module 69 is readable by the series of integrated electronic components 38 that perform the desired electronic function of device 20. In such manner, the series of integrated electronic components 38 can determine the presence or absence of a cosmetic tray 60 having the proper configuration for accessorizing device 20. If an incorrect or undesired cosmetic tray is inserted in carrier 52, the series of integrated electronic components 38 will not recognize the incorrect cosmetic tray and through internally programmed protocols, the series of integrated electronic components 38 will be at least partially disabled and the device 20 will not function in its desired manner. Readable electronic identification module 69 can be either affixed to a surface of substrate 62 or alternatively embedded therein to prevent unauthorized tampering of readable electronic identification module 69. In its most common form, readable electronic identification module 69 is a radio frequency identification device which is well known in the industry and can be encoded with a readable signature for recognition by the series of integrated electronic components 38 of device 20.

Figure 4:
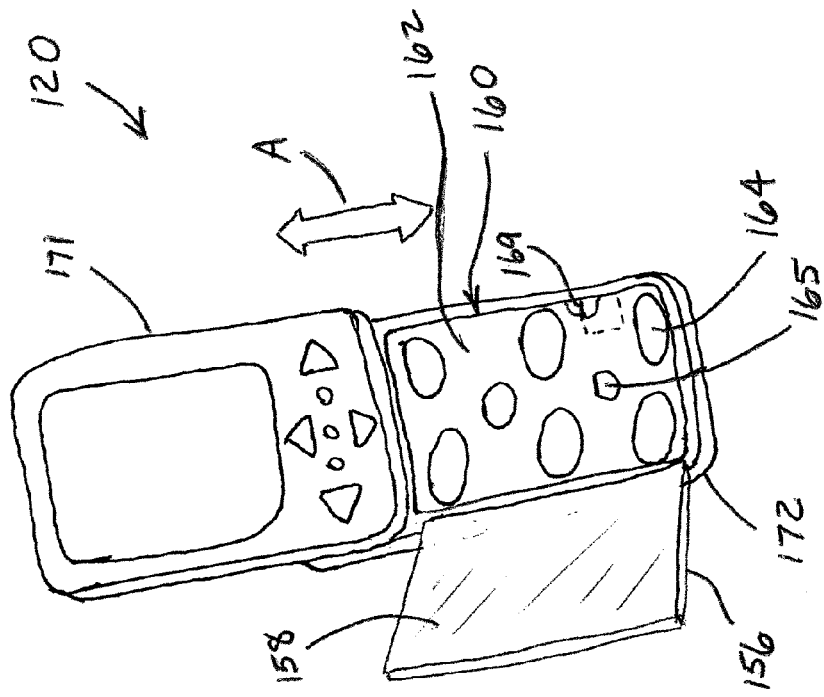
FIG. 4 is a perspective view of the personal electronics device of FIG. 3 wherein the first and second segments are linearly displace one with respect to the other to reveal the cosmetics tray.
Figure 3:
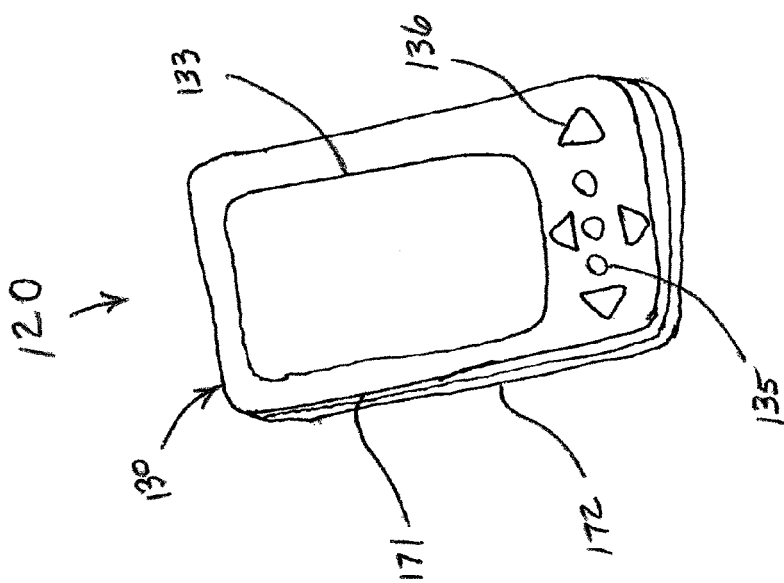
FIG. 3 is a perspective view of an alternate embodiment of a personal electronics device incorporating a cosmetics tray wherein the first and second segments linearly slide one with respect to the other.

Turning now to FIGS. 3-4, an alternate embodiment 120 of a personal electronics device is illustrated wherein the personal electronics device is of the form of a digital electronic game having a viewable screen 133 and user control buttons 135, 136. Device 120 has a case 130 divided into two segments 171, 172 wherein first segment 171 defines the first compartment 132 for housing its series of integrated electronic components 138 (not separately illustrated), viewable screen 133, and user control buttons 135, 136. Second segment 172 is slidably translatable with respect to first segment 171 as shown by arrow "A" in FIG. 4. Second segment 172 houses therein a removable cosmetics tray 160 comprising a substrate 162 having a plurality of cosmetic deposits 164, 165 retained therein and also can include a readable electronic identification module 169 associated therewith. Second segment 171 can also have a folding cover 156 hingedly attached thereto to cover cosmetics tray 160 when in a closed configuration. Folding cover 156 can also have a mirror 158 affixed thereto for the convenience of the user.

Figure 6:
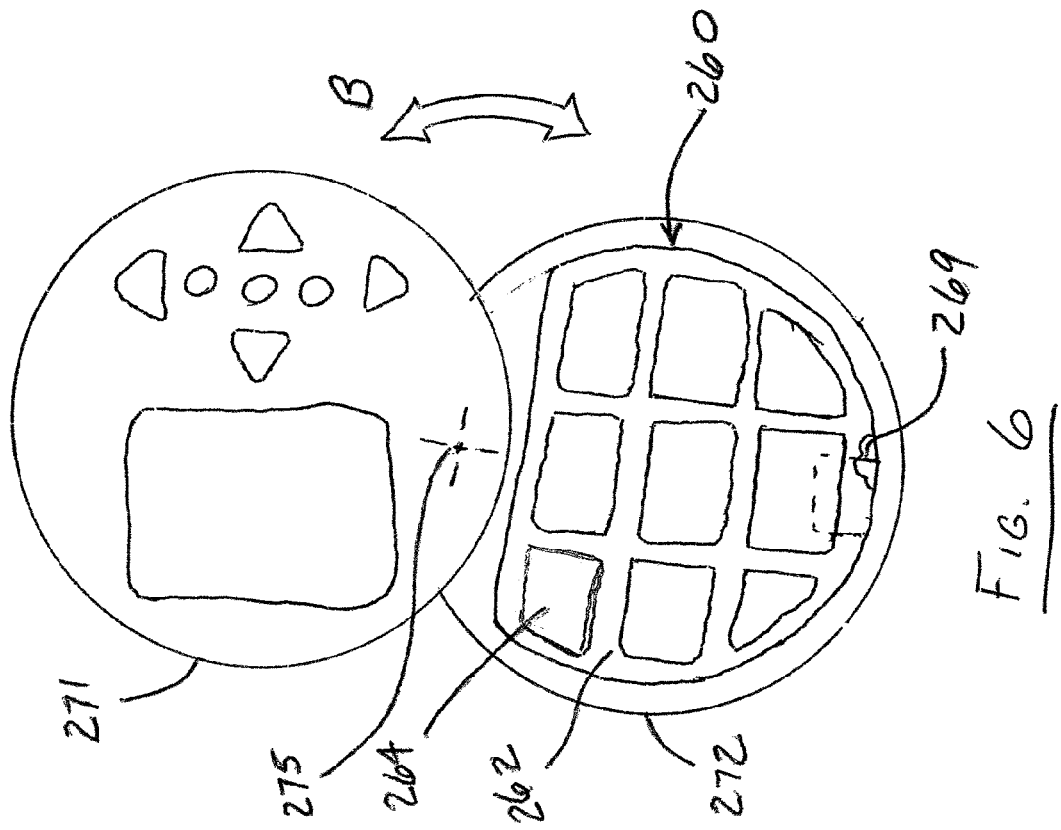
FIG. 6 is a perspective view of the personal electronics device of FIG. 5 wherein the first segment is pivoted with respect to the second segment to reveal the cosmetics tray.
Figure 5:
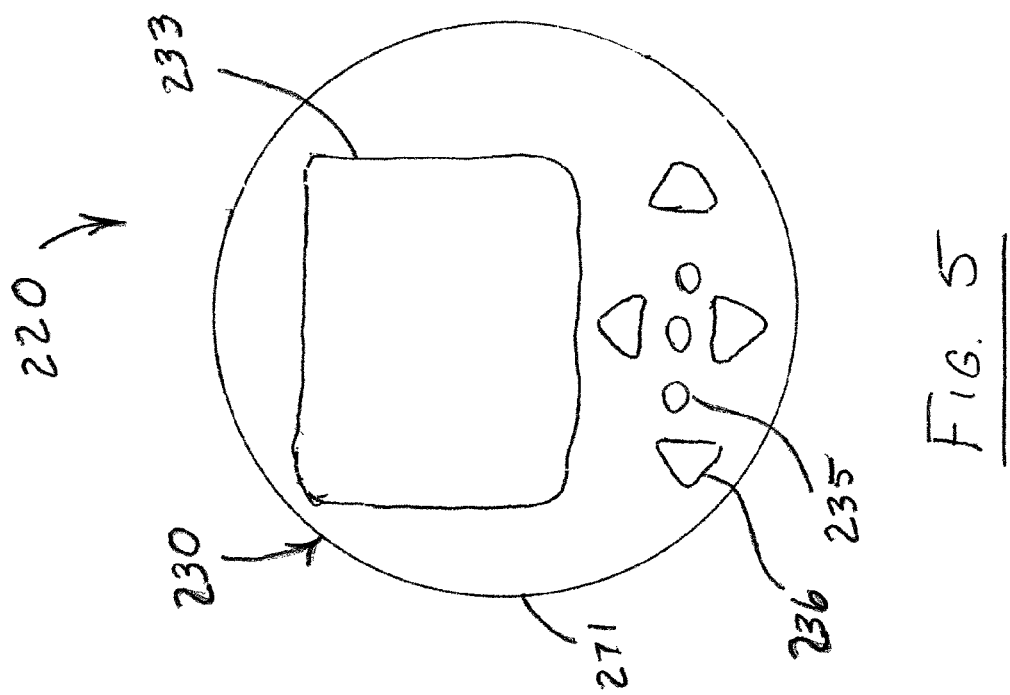
FIG. 5 is a perspective view of an alternate embodiment of a personal electronics device incorporating a cosmetics tray wherein the first and second segments are pivotal one with respect to the other.

Yet another embodiment of a personal electronics device 220 is illustrated in FIGS. 5-6 wherein device 220 includes a case 230 having a first segment 271 and a second segment 272. First segment 271 includes the series of integrated electronic components 238 (not here illustrated), a viewable screen 233, and user control buttons 235, 236 for user interface with device 220. Second segment 272 includes a replaceable cosmetics tray 260 having a plurality of cosmetic deposits 264 received in a compatibly formed substrate 262. Substrate 262 can also include a readable electronic identification module 269 associated therewith for recognition by the series of integrated electronic components 238 in segment 271. First and second segments 271 and 272 are pivotally affixed one to the other at pivot point 275 such that access to cosmetics tray 260 is accomplished by pivoting segments 271 and 272 in opposite directions as indicated by arrow "B". Once the cosmetic tray is no longer in use, segments 271 and 272 can be pivoted in reverse manner to conceal cosmetics tray below segment 271.

Figure 7:
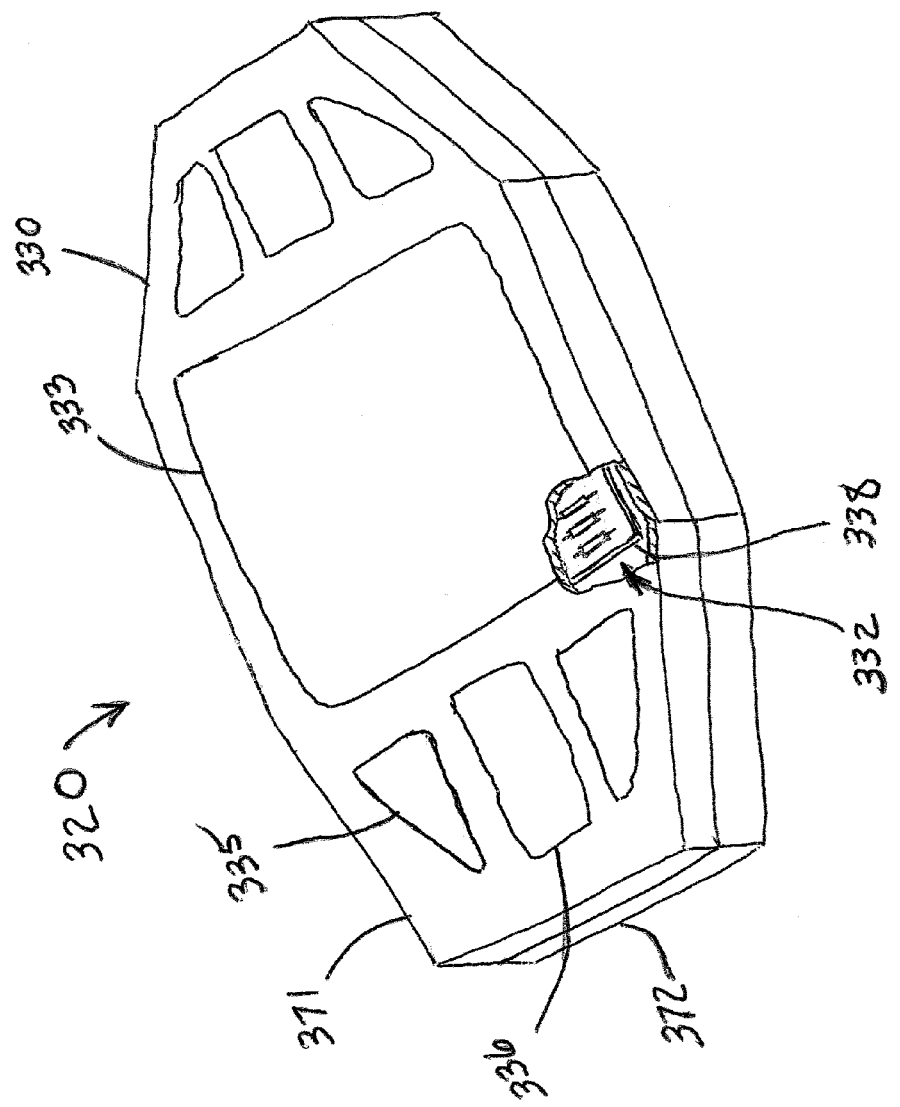
FIG. 7 is a perspective view of an alternate embodiment of a personal electronics device incorporating a cosmetics tray wherein the cosmetics tray is at least partially covered by one or more hinged lids.
Figure 8:
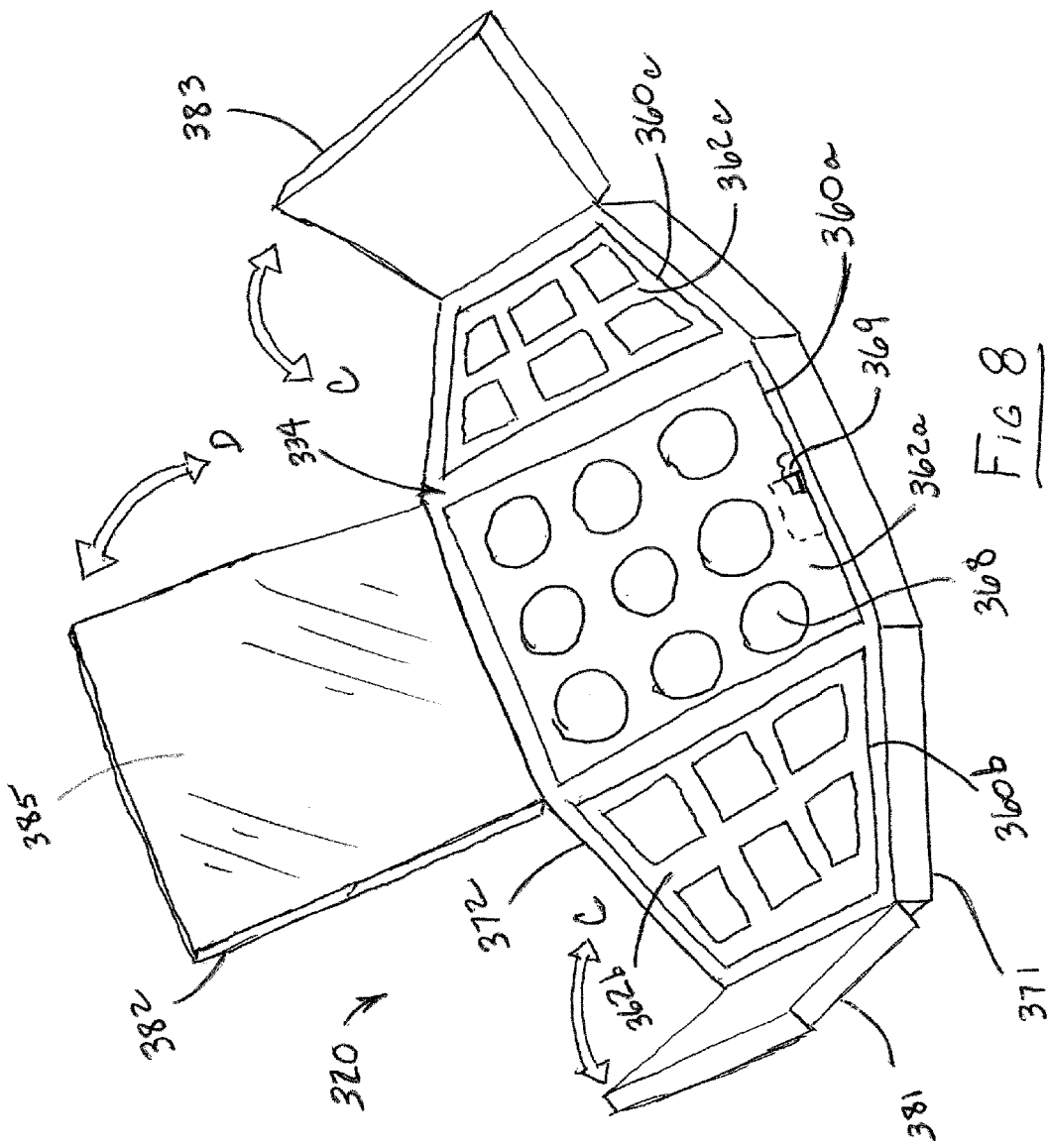
FIG. 8 is a perspective view of the personal electronics device of FIG. 7 wherein the cosmetics tray is revealed by opening the one or more lids.

Another embodiment of a personal electronics device according to the present invention is illustrated in FIGS. 7-8 showing device 320 having a case 330 comprising first segment 371 and a second segment 372. First segment 371 in a like manner to previous embodied devices 20, 120, and 220 houses a series of integrated electronic components 338 in a compartment 332 for performing a desired electronic function and further includes a viewable display 333 and user control keys 335, 336. In device 320, however, segments 371 and 372 are not movable one with respect to the other. Segment 372 is positioned oppositely from segment 371 in case 330 and has an interior compartment 334 accessible via one or more hinged covers 381, 382, 383. Outer hinged covers 381, 383 are opened by rotating according to the direction arrows "C", while middle cover 382 is opened by rotating according to direction arrow "D". Middle cover 382 can also include a mirror 385 on an inner surface for the convenience of the user. Interior compartment 334 has housed therein one or more cosmetic trays 360a, 360b, and 360c. Each cosmetic tray 360a, 360b, 360c comprises a substrate 362a, 362b, and 362c in which are contained a plurality of cosmetic deposits 368. Further, at least one substrate such as substrate 362a includes a readable electronic identification module 369 associated therewith either by being attached thereto or embedded therein for reading by the series of integrated electronic components 338 that also perform the desired function of device 320. In its most preferred embodiment, each of the substrates 362a, 362b, and 362c of device 320 includes a readable electronic identification module 369. Each cosmetic tray 360a, 360b, and 360c is independently replaceable such as to prevent the necessity of discarding all of the cosmetics when only a portion of the trays 360a, 360b, and 360c have been depleted.

Figure 9:
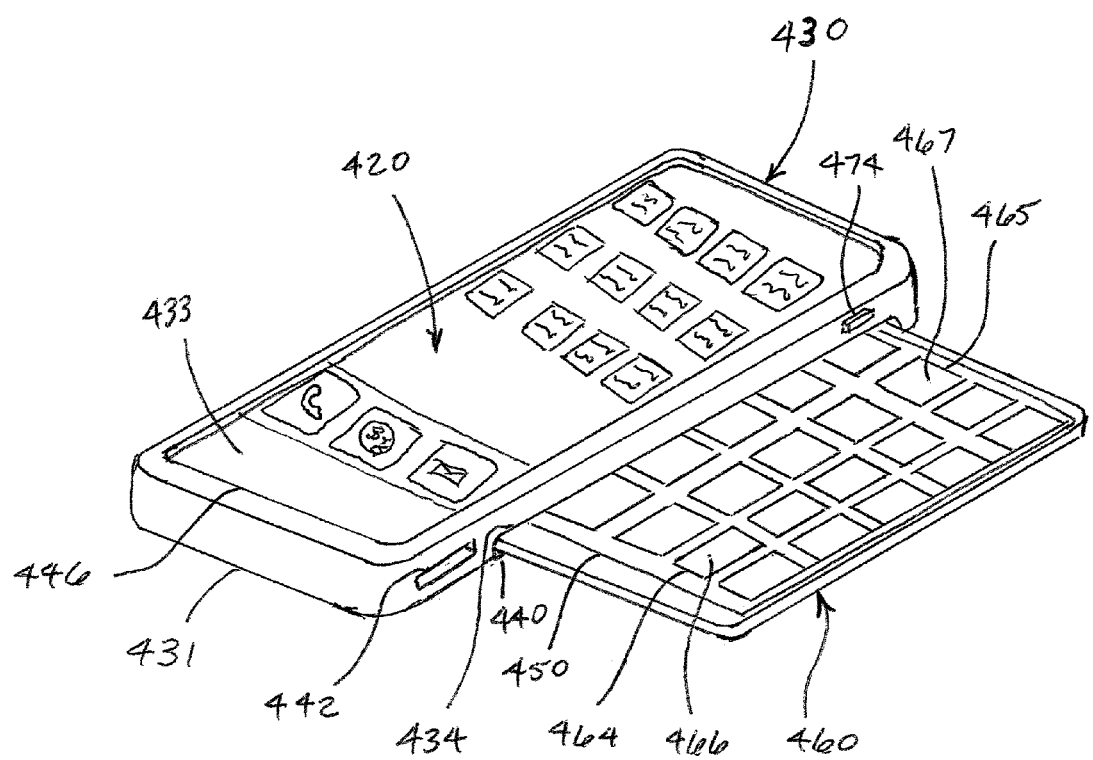
FIG. 9 is a perspective view of a personal electronics device encased in a protective case incorporating a slide out cosmetics tray.
Figure 10:
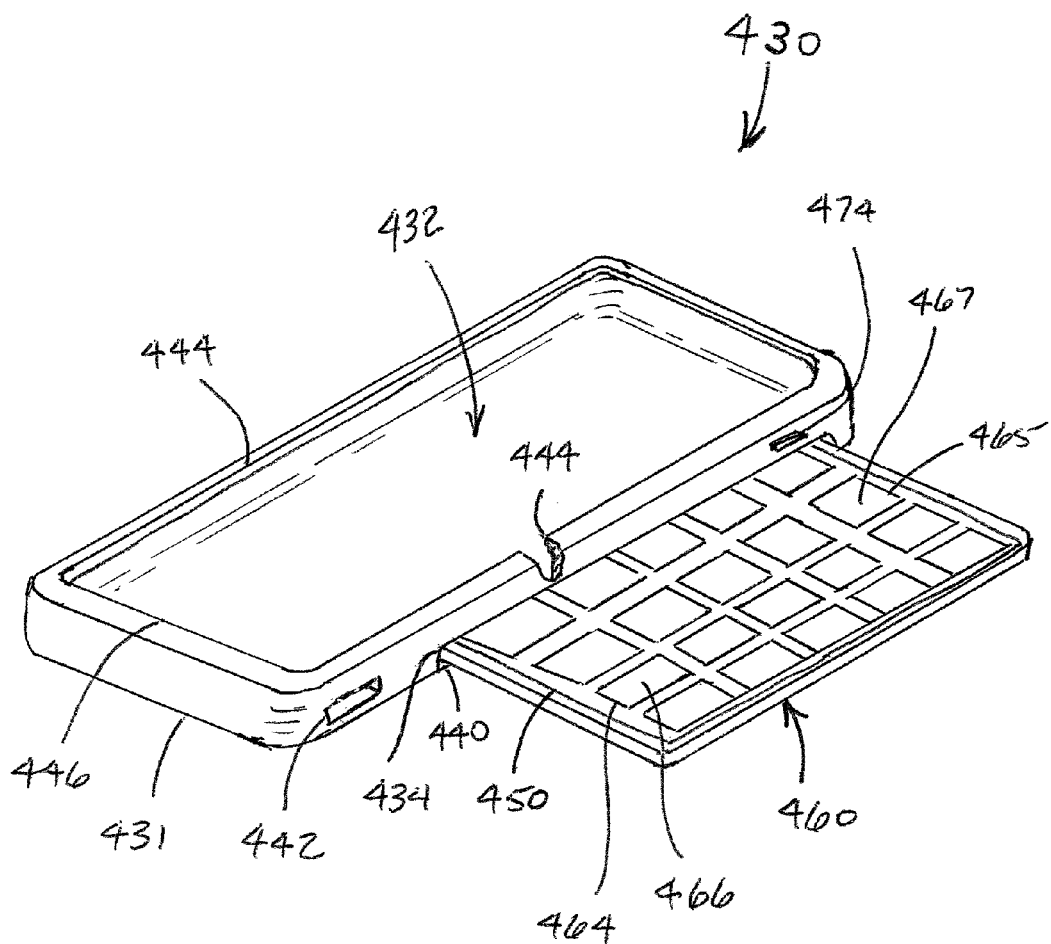
FIG. 10 is a perspective view of the protective case of FIG. 9 with the personal electronics device removed therefrom.

FIGS. 9-10 illustrate an alternate embodiment of a protective case 430 for a personal electronics device 420, such as a cell phone, personal digital assistant, digital camera, or digital electronic game. Protective case 430 has a shell 431 that defines different compartments. A first compartment 432 is shaped to receive through an opening 446 a specific personal electronics device 420. Opening 446 is defined by a resilient rim 444 that is deformable to receive therethrough personal electronic device 420. Once received in first compartment 432, personal electronic device 420 is retained therein by rim 444 extending over an outer peripheral portion of device 420. Opening 446 is sized to permit unobstructed access to display screen 433 of device 420 so that touch screen functions of display screen 433 are readily available to a user thereof.

Since many of devices 420 incorporate a digital camera function therewith, and a lens (not shown) for the camera function is positioned on an opposite surface of device 420 from display screen 433 and would normally be covered by shell 431, an aperture (See conical aperture 588 in FIG. 12) in shell 431 can be defined to be in registration with the camera lens. Aperture 588 is typically conical in shape and the cone angle corresponds to the field of view of the camera lens to provide unobstructed viewing through the camera lens and shell 431.

Shell 431 also defines a second compartment 434. Second compartment 434 defines a storage volume 440 which houses a cosmetic tray 450. Cosmetic tray 450 is supported by a carrier 460 which is telescopically received in and selectively extendable from storage volume 440 of shell 431. Cosmetic tray 450 has a plurality of recesses 464, 465 in which retain therein a variety of cosmetic deposits 466, 467 such as nail polish, mascara, eyeliner, lipstick, lip liner, or lip gloss in the same manner as described above. Carrier 460 can be spring biased (not shown) to an open or extended position in a manner well known in the industry. Lock button 474 engages with carrier 460 to keep carrier 460 retracted within storage volume 440. When button 474 is pushed thereby disengaging from carrier 460 the spring bias automatically extends carrier 460 as illustrated for access to the cosmetic deposits 466, 467 by the user.

Shell 431 can also define a third compartment 442. Compartment 442 as illustrated is a slot for receiving a flash memory card (not shown but well known in the art). Third compartment 442 is typically configured to receive and retain therein a specific configuration flash memory card compatible with personal electronic device 420.

Figure 11:
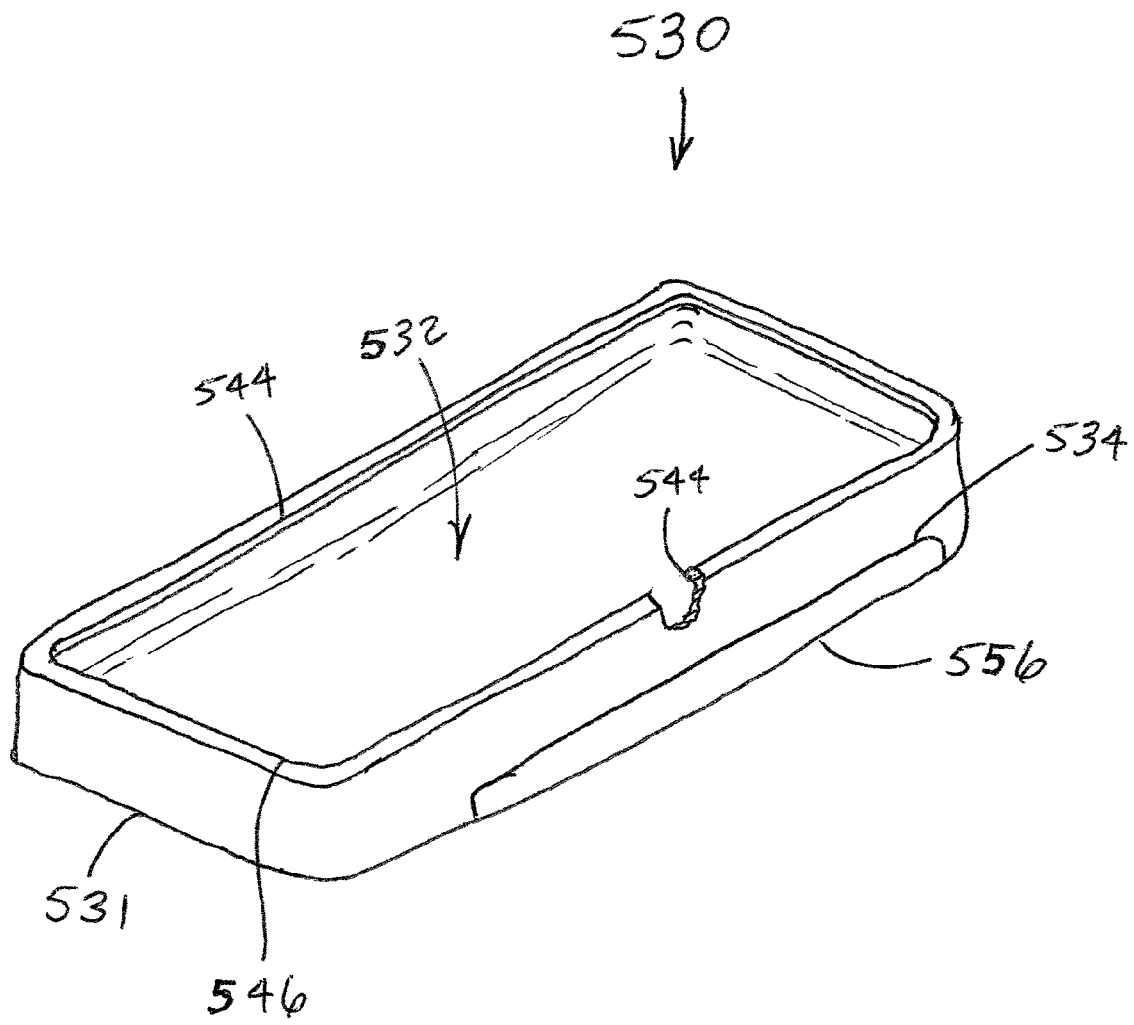
FIG. 11 is a top perspective view of an alternate embodiment protective case.
Figure 12:
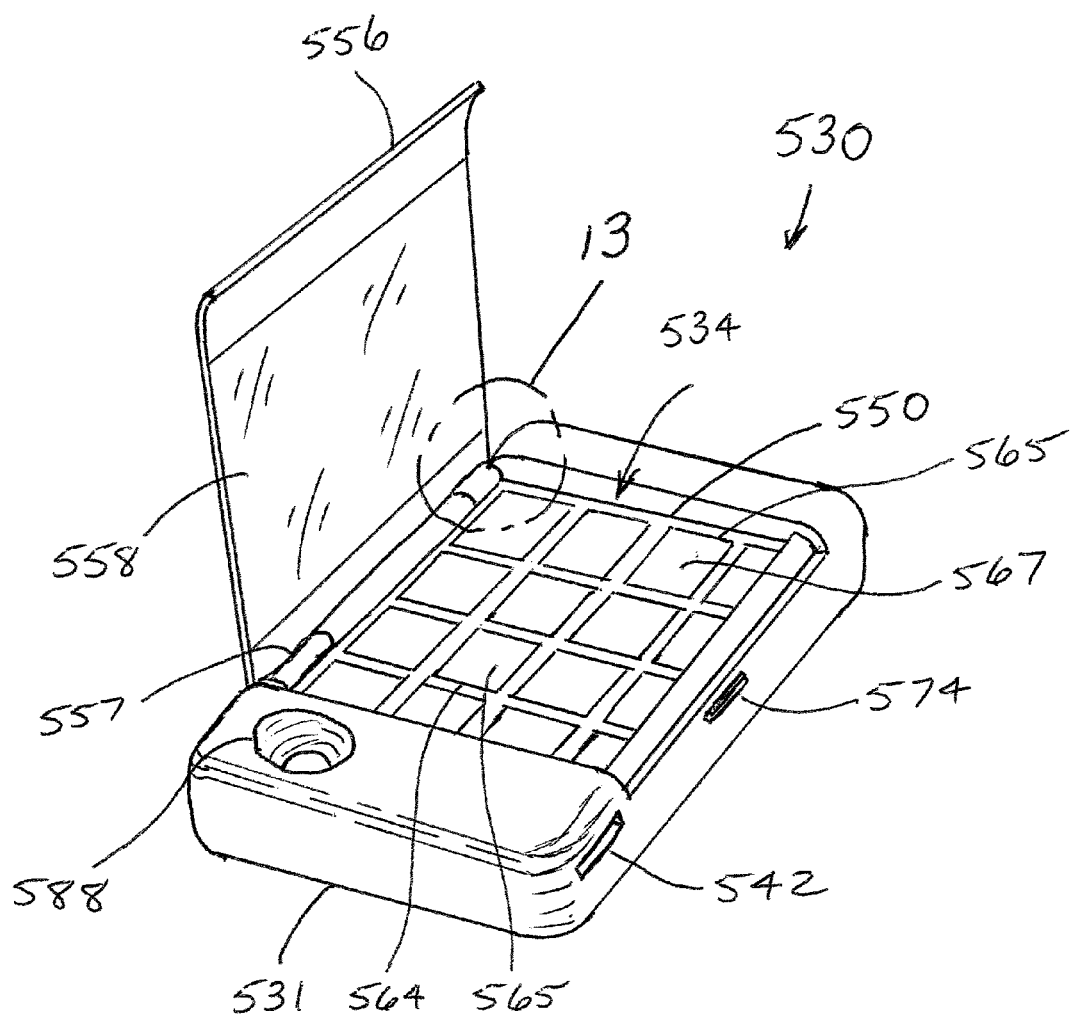
FIG. 12 is a bottom perspective view of the protective case of FIG. 11 with a hinged cosmetics tray compartment lid in the open position.
Figure 13:
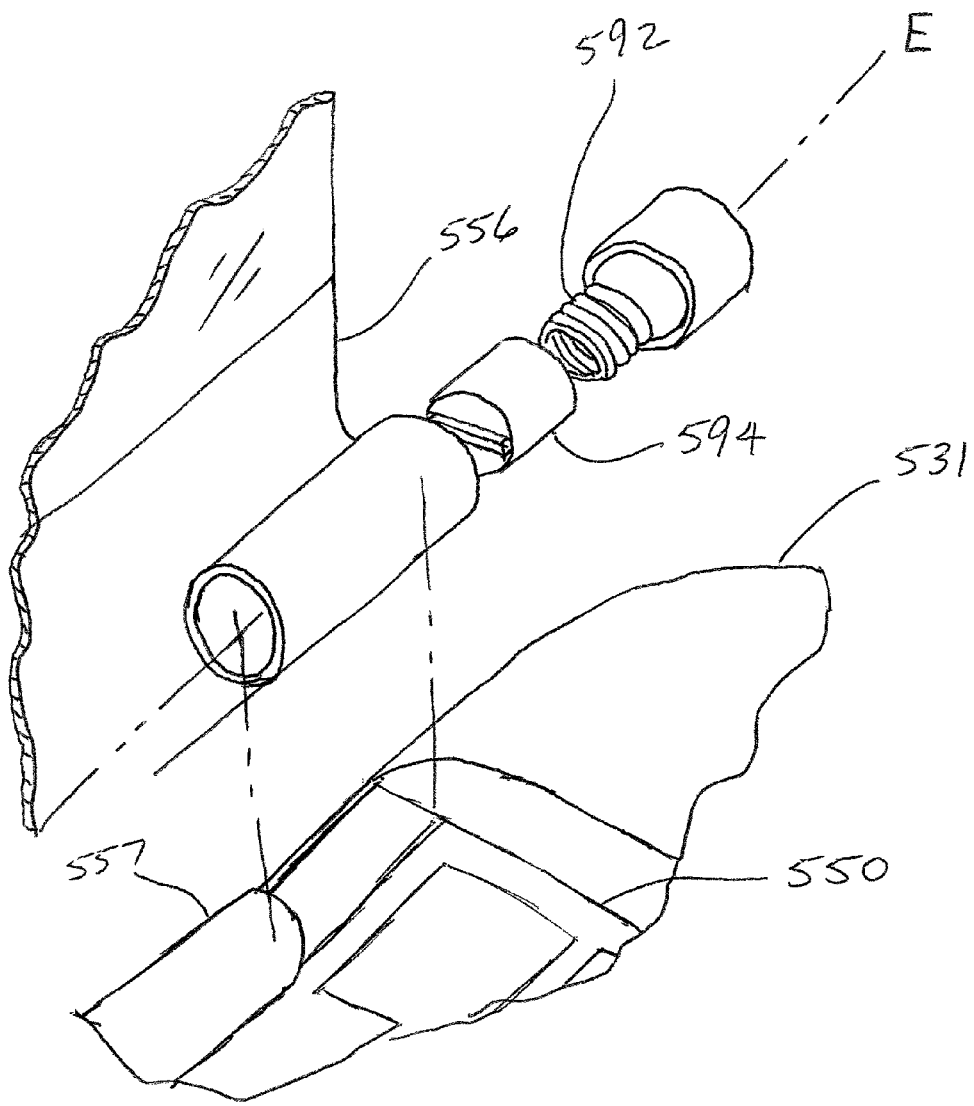
FIG. 13 is an enlarged exploded perspective view of the cosmetics compartment hinge mechanism.

FIGS. 11-13 illustrate an alternate embodiment protective case 530. Protective case 530 is similar to protective case 430 and includes a shell 531 defining a first compartment 532 for receiving a personal electronic device such as device 420 which is retained therein by lip 544 defining opening 546 in a manner similar to lip 444 as described above. Shell 531 also defines a third compartment 542 for receiving and retaining therein a flash memory module compatible with personal electronic device 420. A conical aperture 588 is defined by shell 431 to be in registration with a camera lens of device 420 wherein the angle of the cone is such to correspond to the camera lens field of view.

Shell 531 also defines a second compartment 534 on an opposite side of shell 531 from first compartment 532. Second compartment 534 defines a storage volume therein and is accessible by opening foldable cover 556 that has a mirrored surface 558 on an inner surface thereof. Foldable cover 556 is has a hinge 557 along one side thereof and can be secured in a closed position by a lock button 574 on an opposite side. As illustrated in FIG. 13, hinge 557 along axis "E" can include a torsion spring 592 for biasing foldable cover 556 to an open position allowing access to second compartment 534. A damper 594 resists the bias of spring 594 such that when lock button 574 is pressed to release foldable cover 556, cover 556 opens in a slow rotational manner. The opening rate of cover 556 is determined by the spring force of spring 592 and the resistance level of damper 594. Damper 594 can also exhibit unidirectional resistance such that damper 594 resists rotation of cover 556 in an opening direction, but exhibits little to no resistance when cover 556 is rotated about hinge 557 in a closing direction.

A cosmetic tray 550 is housed in second compartment 534. Cosmetic tray 550 is supported by a shell 531 and has a plurality of recesses 564, 565 in which are retained a variety of cosmetic deposits 566, 567 such as nail polish, mascara, eyeliner, lipstick, lip liner, or lip gloss in the same manner as described above. When the user desires a different variety of cosmetics or when the present cosmetics have dwindled, the old cosmetic tray 550 can be removed and a new cosmetic tray 550 be inserted in its place.

Figure 14:
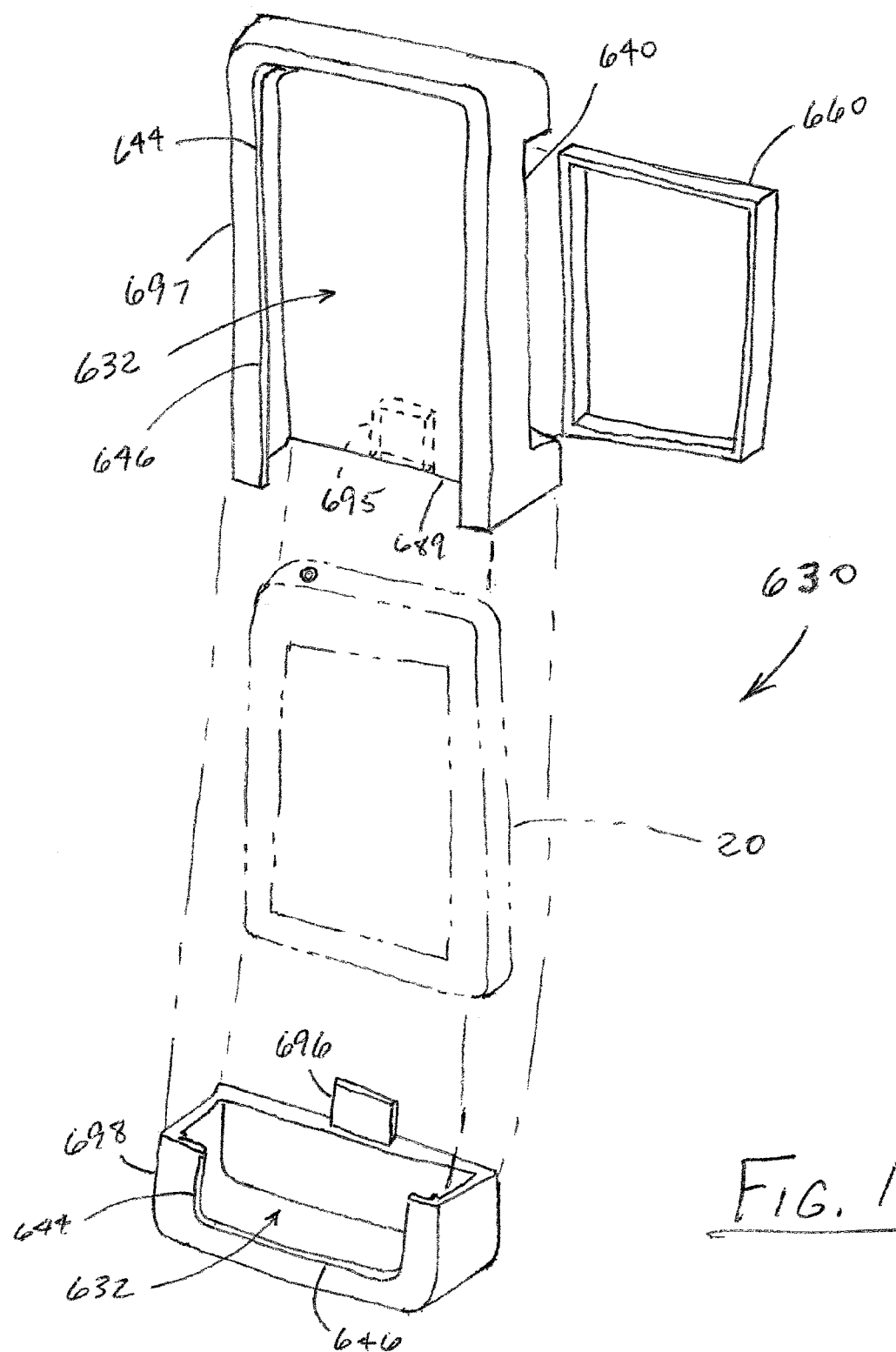
FIG. 14 is a perspective view of an embodiment having a separable protective case.

FIG. 14 illustrates an alternate embodiment case 630 comprising separable first and second shell elements 697, 698. Each shell element 697, 698 combine to define first compartment 632 in which an electronic device 20 is received. First shell element 697 further defines a receptacle 695 at a mating edge 689 and second shell element 698 includes a tab 696 at a mating edge 690. Case 630 also defines a storage volume 640 in which is received a removable cosmetic tray 660 which includes various cosmetic deposits such as deposits 466, 467 as illustrated above in FIG. 9. In use, first and second shell elements 697, 698 are telescopically sleeved over opposite ends of electronic device 20 such that electronic device is received in first compartment 632. Tab 696 is received in receptacle 695 and is removably locked therein in a manner well known in the industry. In this manner rim 644 extends over the outer periphery of electronic device 20 and securely retains electronic device in case 630.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A protective case for a personal electronics device of the type such as, but not limited to, cell phones, personal digital assistants, digital camera, and digital electronic games, wherein said protective case comprises:

a shell defining a first compartment and a second compartment;

said first compartment including a rim defining an opening for viewing and user access of a personal electronics device therethrough, said rim formed as a resilient deformable lip extending over an upper peripheral portion of said opening for engagement with an outer peripheral portion of the personal electronics device and retain retention of the personal electronics device therein;

said second compartment defining a selectively accessible storage volume; and a cosmetic tray housed in said accessible storage volume, said cosmetic tray having at least one form of cosmetic selected from the group of nail polish, mascara, eyeliner, lipstick, lip liner, and lip gloss, wherein said cosmetic tray is supported by a tray carrier and said tray carrier is telescopically received in said storage volume.

2. The protective case according to claim 1 wherein said cosmetic tray is replaceable.

3. The protective case according to claim 1 wherein said second compartment includes a hinged cover, said hinged cover movable between a closed position and an open position, and further wherein said hinged cover in said closed position partially defines said accessible storage volume.

4. The protective case according to claim 3 wherein said hinged cover is movably biased to said open position with a spring.

5. The protective case according to claim 4 wherein said hinged cover further includes a damper, said damper resisting said biasing spring to decrease an opening rate of said hinged cover.

6. The protective case according to claim 1 wherein said shell is comprised of a first shell element defining a portion of said first compartment and a second shell element defining another portion of said first compartment and in combination defining said first compartment, said first and said second shell elements being selectively joinable and separable.

7. The protective case according to claim 6 wherein said first shell element defines a receptacle and said second includes a tab and further wherein said tab is received in said receptacle to lock said first shell element to said second shell element.

8. The protective case according to claim 1 wherein said shell defines a conical aperture therethrough positioned for registration with a camera lens of the personal electronic device.

9. The protective case according to claim 1 wherein said shell defines a third compartment, said third compartment for storage of a flash memory device therein.

10. A protective case for a personal electronics device of the type such as, but not limited to, cell phones, personal digital assistants, digital camera, and digital electronic games, wherein said protective case comprises:

a shell defining a first compartment and a second compartment;

said first compartment including a rim defining an opening for viewing and user access of a personal electronics device therethrough, said rim formed as a resilient deformable lip extending over an upper peripheral portion of said opening for engagement with an outer peripheral portion of the personal electronics device and retain retention of the personal electronics device therein;

said second compartment defining a selectively accessible storage volume, wherein said second compartment includes a hinged cover, said hinged cover movable between a closed position and an open position, and further wherein said hinged cover in said closed position partially defines said accessible storage volume and further wherein said hinged cover is movably biased to said open position with a spring and said hinged cover further including a damper, said damper resisting said biasing spring to decrease an opening rate of said hinged cover; and a cosmetic tray housed in said accessible storage volume, said cosmetic tray having at least one form of cosmetic selected from the group of nail polish, mascara, eyeliner, lipstick, lip liner, and lip gloss.

11. The protective case according to claim 10 wherein said cosmetic tray is supported by a tray carrier.

12. The protective case according to claim 10 wherein said cosmetic tray is replaceable.

13. The protective case according to claim 10 wherein said shell is comprised of a first shell element defining a portion of said first compartment and a second shell element defining another portion of said first compartment and in combination defining said first compartment, said first and said second shell elements being selectively joinable and separable.

14. The protective case according to claim 13 wherein said first shell element defines a receptacle and said second includes a tab and further wherein said tab is received in said receptacle to lock said first shell element to said second shell element.

15. The protective case according to claim 10 wherein said shell defines a conical aperture therethrough positioned for registration with a camera lens of the personal electronic device.

16. The protective case according to claim 10 wherein said shell defines a third compartment, said third compartment for storage of a flash memory device therein.

* * * * *